(12) United States Patent
Shu

(10) Patent No.: US 6,773,061 B1
(45) Date of Patent: Aug. 10, 2004

(54) SHOCK-ABSORBING BICYCLE SADDLE

(75) Inventor: Gio Shu, Taichung (TW)

(73) Assignee: Selle Tech Industrial Co., LTD, Taichung Hsien (TW)

( * ) Notice: Subject to any disclaimer, the term of this patent is extended or adjusted under 35 U.S.C. 154(b) by 0 days.

(21) Appl. No.: 10/401,674

(22) Filed: Mar. 31, 2003

(30) Foreign Application Priority Data

Jan. 20, 2003 (TW) ........................................ 92101085 A

(51) Int. Cl.[7] .............................. B60N 2/38; B62J 1/02
(52) U.S. Cl. .................... 297/195.1; 297/208; 297/210; 297/211; 297/212
(58) Field of Search .............................. 297/195.1, 201, 297/208, 209, 210, 211, 212, 213

(56) References Cited

U.S. PATENT DOCUMENTS

| | | | | |
|---|---|---|---|---|
| 5,020,851 A | * | 6/1991 | Chen | 297/195.1 |
| 5,294,174 A | * | 3/1994 | Bigolin | 297/212 |
| 5,507,476 A | * | 4/1996 | Lin | 267/132 |
| 5,775,710 A | * | 7/1998 | Yu | 280/283 |
| 5,855,410 A | * | 1/1999 | Lin | 297/215.15 |
| 6,007,148 A | * | 12/1999 | Yu | 297/195.1 |
| 6,095,601 A | | 8/2000 | Yu | |
| 6,113,184 A | * | 9/2000 | Barnes | 297/208 |
| 6,443,524 B1 | * | 9/2002 | Yu | 297/209 |

* cited by examiner

*Primary Examiner*—Peter M. Cuomo
*Assistant Examiner*—Sarah C. Burnham
(74) *Attorney, Agent, or Firm*—Browdy and Neimark, P.L.L.C.

(57) ABSTRACT

A shock-absorbing bicycle saddle includes a saddle body, a top saddle frame transversely mounted in the bottom side of the rear part of the saddle body and defining with the bottom side of the saddle body a buffer space, two elastic members bilaterally stopped below the top saddle frame, a bottom saddle frame provided at the bottom side of the elastic members, and a bracket having two shank portions each having a front end respectively fixedly fastened to the bottom side of the front part of the saddle body and a rear end respectively fastened to left and right ends of the bottom saddle frame.

4 Claims, 5 Drawing Sheets

SHOCK-ABSORBING BICYCLE SADDLE

BACKGROUND OF THE INVENTION

1. Field of the Invention

The present invention relates generally to bicycle saddles and, more particularly, to a shock-absorbing bicycle saddle.

2. Description of the Related Art

A regular bicycle saddle generally comprises a saddle body, which has a relatively narrow front part and a relatively broader rear part, a bracket made from a metal wire rod and fixedly fastened to the bottom side of the saddle body. The bracket has two shank portions symmetrically disposed at two lateral sides. The shank portions each have a front end fixedly fastened to the front part of the saddle body, a middle part spaced from the bottom side of the saddle body at a distance for fastening to the seat post of a bicycle, and a rear end, which may be directly fastened to the rear part of the saddle body or fastened to a respective metal spring at the bottom side of the rear part of the saddle body. This design of bicycle saddle absorbs shocks by means of the buffer space defined between the bottom side of the saddle body and the two shank portions of the bracket or the metal springs between the saddle body and the bracket. Due to limited shock absorbing power, this design of bicycle saddle does not give a comfort riding to the rider.

SUMMARY OF THE INVENTION

It is the primary objective of the present invention to provide a shock-absorbing bicycle saddle, which provides a high shock absorbing power, giving a comfortable ride to the rider.

To achieve this objective of the present invention, the shock-absorbing bicycle saddle comprises a saddle body having a relatively narrower front part and a relatively broader rear part, a top saddle frame mounted in a bottom side of the rear part of the saddle body and defining with the saddle body a buffer space, two elastic members bilaterally suspended below the rear part of the saddle body and respectively stopped below the top saddle frame, a bottom saddle frame having left and right ends respectively stopped against bottom sides of the elastic members, and a bracket including two shank portions each having a front end respectively fixedly fastened to a bottom side of the front part of the saddle body and a rear end respectively fastened to the left and right ends of the bottom saddle frame.

DETAILED DESCRIPTION OF THE INVENTION

Figure 1:
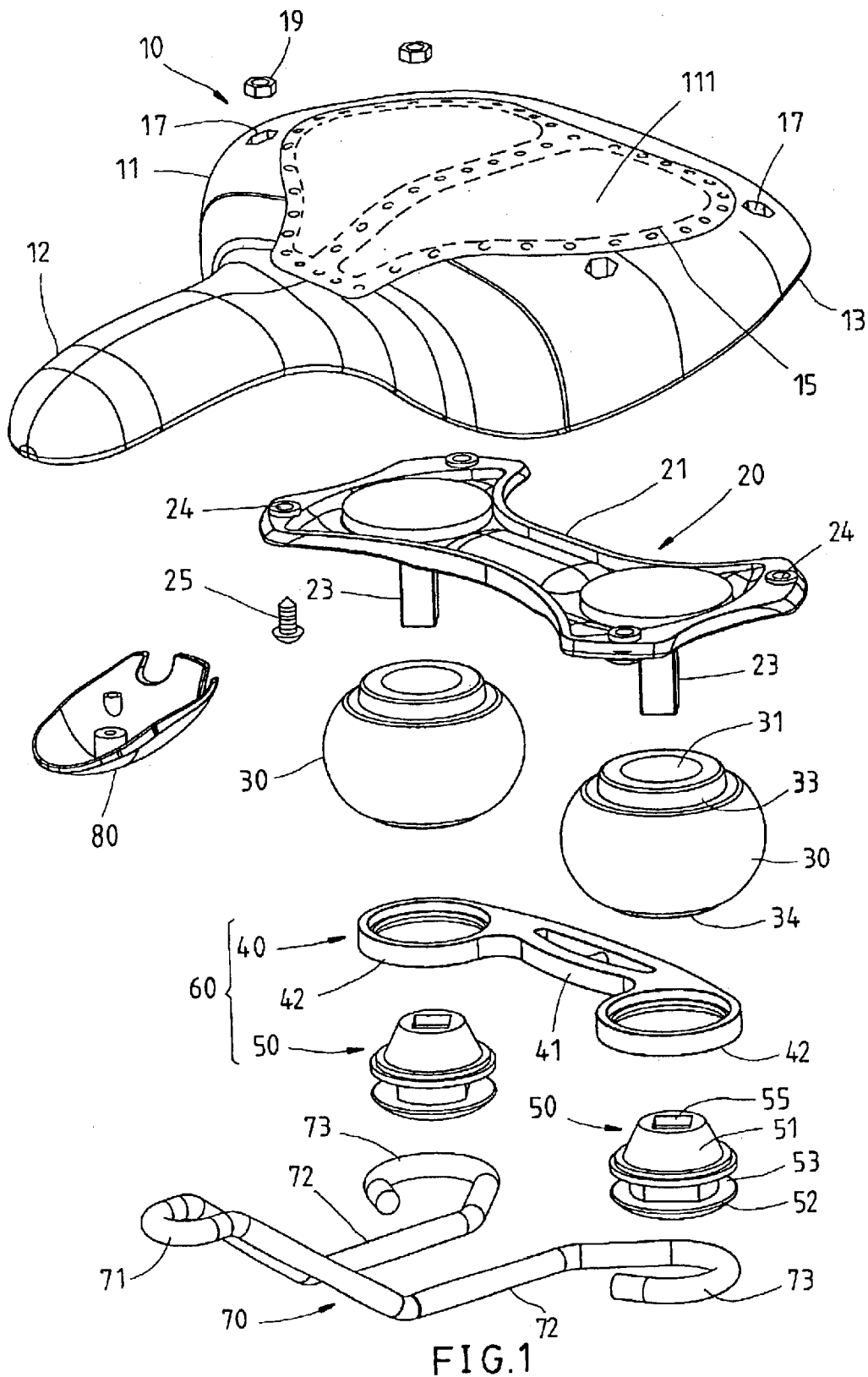
FIG. 1 is an exploded view of a shock-absorbing bicycle saddle according to a preferred embodiment of the present invention.
Figure 2:
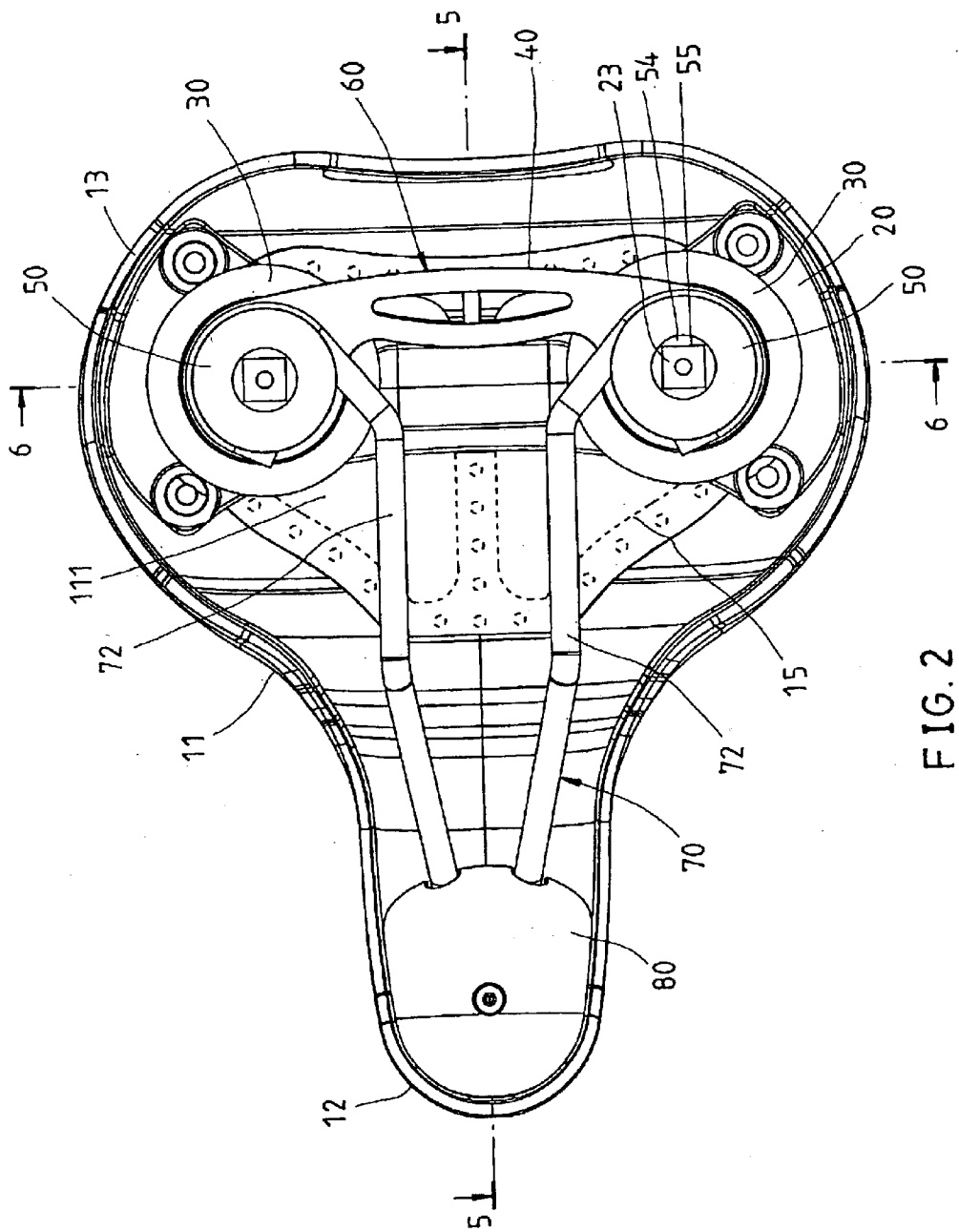
FIG. 2 is a bottom view of the shock-absorbing bicycle saddle according to the preferred embodiment of the present invention.
Figure 3:
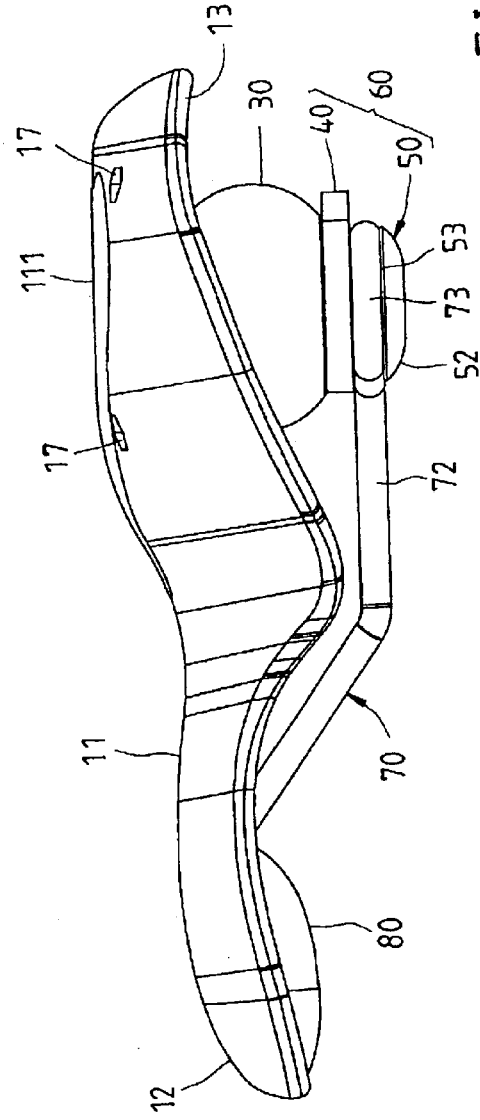
FIG. 3 is a left side view of the shock-absorbing bicycle saddle according to the preferred embodiment of the present invention.
Figure 4:
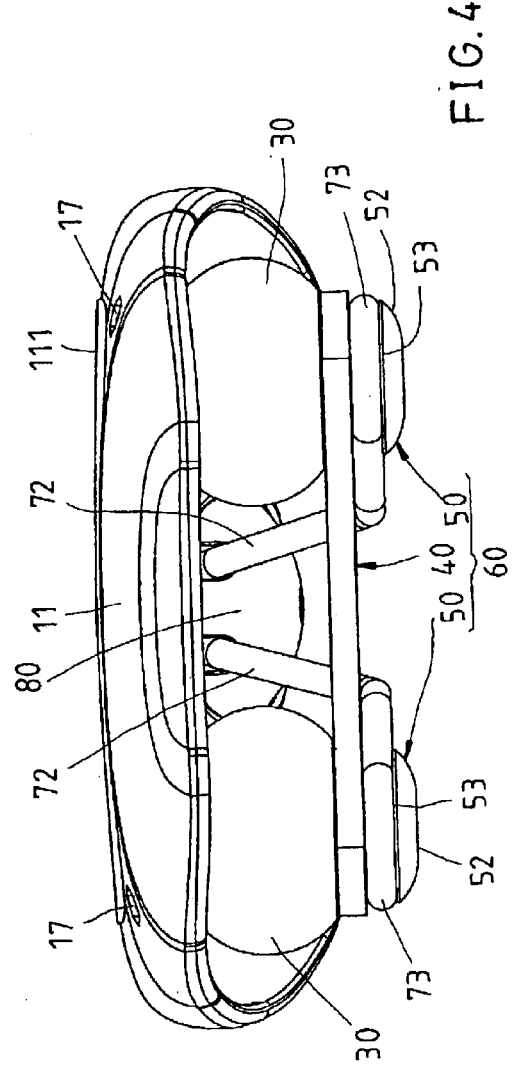
FIG. 4 is an elevational rear view of the shock-absorbing bicycle saddle according to the preferred embodiment of the present invention.

Referring to FIG. 1, a shock-absorbing bicycle saddle in accordance with the preferred embodiment of the present invention is shown comprised of a saddle body 10, a top saddle frame 20, two elastic members 30, a bottom saddle frame 60, a bracket 70, and a front cap 80.

Referring to FIGS. from 2 through 6, the saddle body 10 is a seat for a rider on a bicycle. Similar to a conventional bicycle saddle, the saddle body 10 is comprised of a rigid inner shell 11, a soft outer covering covered on the outside wall of the rigid inner shell 11, and a stuffing sponge sandwiched in between the inner shell 11 and the outer cover. In the annexed drawings, only the inner shell 11 is shown for the saddle body 10. The inner shell 11 has a relatively narrower front part 12, a relatively broader rear part 13, a backward plughole 14 disposed in the bottom side of the front part 12 (see FIG. 5), two bottom recesses 15 bilaterally defined in the bottom side of the rear part 13, two elastic pieces 111 fixedly fastened to the bottom recesses 15 by means of the application of a molding process (this structure is of the known art and seen in U.S. Pat. No. 6,095,601), two symmetrical pairs of locating blocks 16 respectively downwardly protruded from the bottom side of the rear part 13 at two sides near front and rear sides of the bottom recesses 15, and a plurality of countersunk holes 17 respectively formed in the top side of the rear part 13 corresponding to the locating blocks 16, and a plurality of through holes 18 respectively vertically extended through the locating blocks 16 in communication with the countersunk holes 17 (see FIG. 5), and a plurality of nuts 19 respectively press-fitted into the countersunk holes 17. The elevation of the bottom side of each locating block 16 is lower than the elevation of the bottom side of the center area of the rear part 13.

The top saddle frame 20 comprises an elongated base frame 21, two circular recesses 22 in the bottom side of the base frame 21 near two distal ends (see FIG. 6), and two vertical stems 23 of rectangular cross-section respectively downwardly extended from the circular recesses 22 at the center, and four vertical through holes 24 respectively extended through top and bottom sides of the elongated base frame 21 corresponding to the through holes 18 of the rigid inner shell 11 of the saddle body 10. The elongated base frame 21 of the top saddle frame 20 is transversely attached to the bottom side of the rear part 13 of the rigid shell 11 of the saddle body 10, keeping the through holes 24 in alignment with the through holes 18, and then respective screw bolts 25 are respectively upwardly inserted through the through holes 24 of the top saddle frame 20 into the through holes 18 of the rigid shell 11 and then screwed up with the respective nuts 19 in the countersunk holes 17 to fixedly secure the top saddle frame 20 to the rigid inner shell 11 (see FIG. 6). When installed, the base frame 21 is stopped at the bottom side of the locating blocks 16, and a buffer space 26 is defined between the top saddle frame 20 and the bottom side of the inner shell 11.

The elastic members 30 are flat spherical elastomers respectively molded from rubber, each having a vertical through hole 31, a conical bottom coupling portion 32 formed in the bottom end of the vertical through hole 31 and made gradually increased from the top side toward the bottom side, a top annular flange 33 formed in the top side and extended around the top end of the vertical through hole 31, a bottom annular flange 34 formed in the bottom side and extended around the conical bottom coupling portion 32. The elastomers 30 are respectively attached to the bottom side of the elongated base frame 21 to engage the respective top annular flanges 33 into the circular recesses 22 of the top saddle frame 20, enabling the vertical stems 23 of the top saddle frame 20 to pass through the vertical through holes 31 of the elastomers 30. Alternatively, coiled springs may be used for the elastic members 30.

Figure 6:
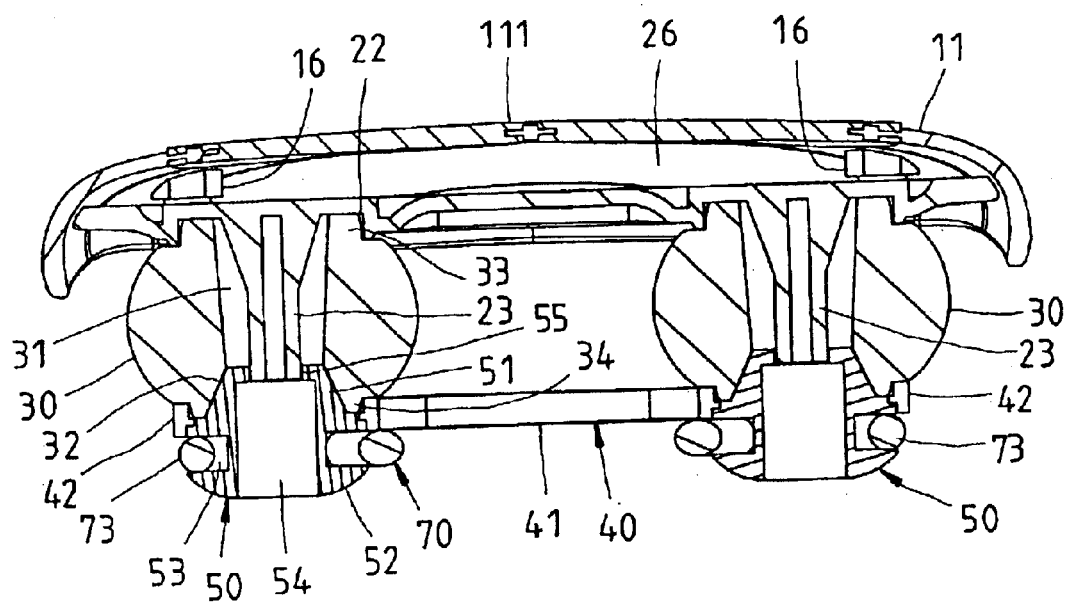
FIG. 6 is a sectional view taken along line 6—6 of FIG. 2, showing the status where the body of the saddle bears no pressure.

The bottom saddle frame 60 is comprised of a connecting member 40 and two positioning members 50. The connecting member 40 comprises an elongated connecting portion 41 and two bearing rings 42 at two ends of the connecting portion 41. Each positioning member 50 comprises a top engagement block 51 shaped like a truncated cone, a bottom block 52 at the bottom side of the top engagement block 51, an endless locating groove 53 extended around the periphery of the bottom block 52 on the middle, a recessed bottom chamber 54 in the bottom side of the bottom block 52, and a rectangular locating hole 55 vertically downwardly extended from the top of the top engagement block 51 to the recessed bottom chamber 54. As illustrated in FIG. 6, the top engagement blocks 51 of the positioning members 50 are respectively upwardly inserted through the bearing rings 42 of the connecting member 40 and fitted into the conical bottom coupling portions 32 of the elastic members 30, enabling the stems 23 of the top saddle frame 20 to be respectively press-fitted into the rectangular locating holes 55 of the positioning members 50.

Figure 5:
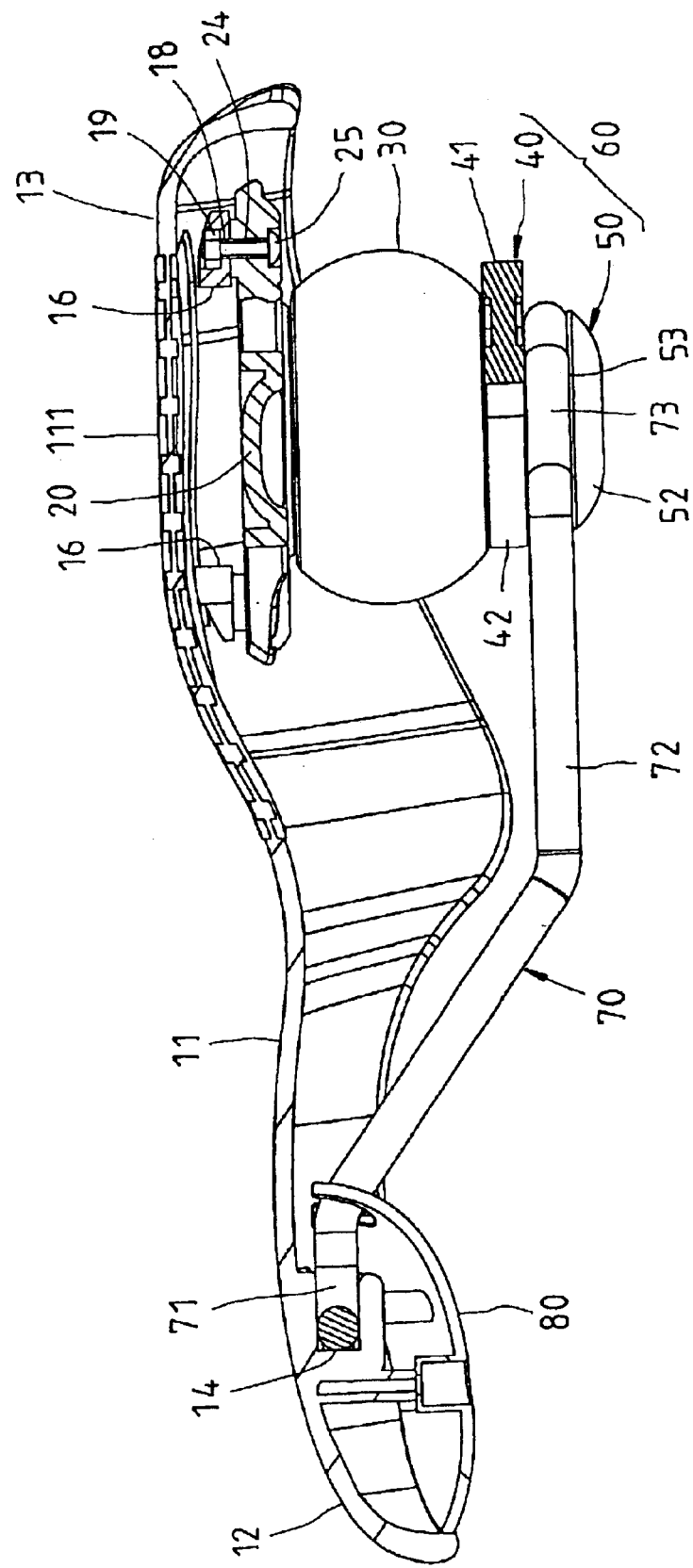
FIG. 5 is a sectional view taken along line 5—5 of FIG. 2.

The bracket 70 is made from a metal wire rod by bending, comprising a U-turn 71, two hooked portions 73, and two shank portions 72 respectively connected between the ends of the U-turn 71 and the hooked portions 73. The U-turn 71 is plugged into the plughole 14 in the bottom side of the front part 12 of the inner shell 11 of the saddle body 10 (see FIG. 5), and the hooked portions 73 are respectively hooked on the endless locating grooves 53 of the positioning members 50. As shown in FIGS. 5 and 6, after positioning of the ends of the bracket 70, the top saddle frame 20, the elastic members 30, the bottom saddle frame 60, and the bracket 70 are firmly secured to one another.

The front cap 80 is capped on the front bottom side of the front part 12 of the inner shell 11 of the saddle body 10, masking the connection area between the bracket 70 and the inner shell 11.

The shock-absorbing bicycle saddle is installed in a bicycle in the same way as the installation of a conventional bicycle saddle, i.e., the two shank portions 72 of the bracket 70 are fixedly fastened to the top end of the bicycle's seat post.

Figure 7:
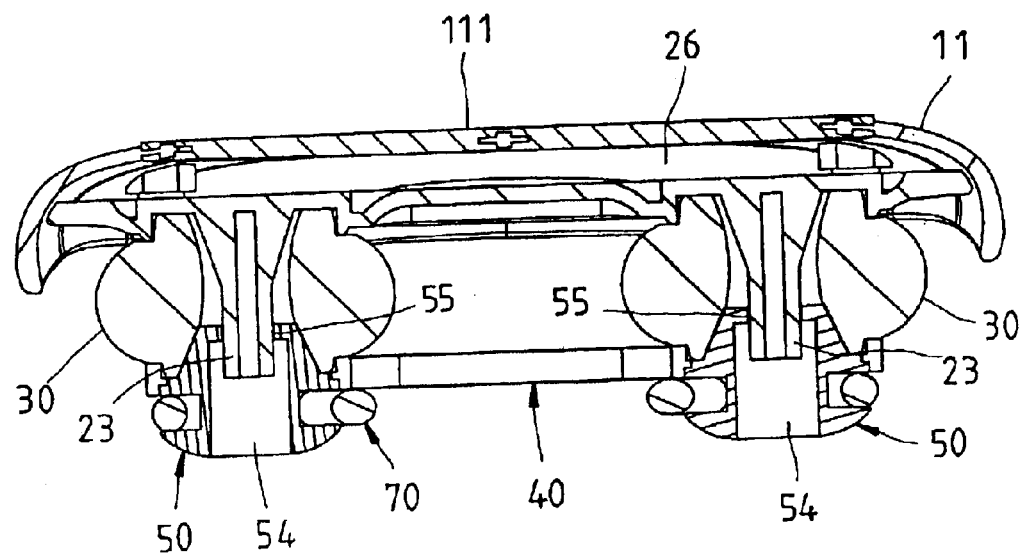
FIG. 7 is similar to FIG. 6 but showing the status where the body of the saddle bears pressure.

Referring to FIGS. 6 and 7, when the rider sitting on the saddle body causes a downward pressure on the saddle body 10 against the bracket 70 or when the bicycle moving over an uneven road surface produces vertical vibrations, the elastic members 30 are vertically compressed or stretched to absorb shocks. Another feature of the present invention is the support of the top saddle frame 20 between the inner shell 11 of the saddle body 10 and the elastic members 30 and the presence of the buffer space 26 between the top saddle frame 20 and the bottom side of the inner shell 11. The buffer space 26 buffers relative conflict between the inner shell 11 and the top saddle frame 20 (for example, when the inner shell 11 received a downward pressure, the inner shell 11 is curved toward the buffer space 26), enhancing the shock absorbing capability of the shock-absorbing bicycle saddle.

What is claimed is:

1. A shock-absorbing bicycle saddle comprising:

a saddle body having a relatively narrower front part and a relatively broader rear part;

a top saddle frame mounted in a bottom side of the rear part of said saddle body, said top saddle frame having left and right ends thereof fixedly fastened to said saddle body, and a bridge portion connected between said left and right ends, said bridge portion being suspended below the saddle body such that a buffer space is defined in between said saddle body and said top saddle frame;

two elastic members bilaterally suspended below the rear part of said saddle body and respectively stopped below said top saddle frame;

a bottom saddle frame having left and right ends respectively stopped against bottom sides of said elastic members; and a bracket provided with two shank portions each having a front end respectively fixedly fastened to a bottom side of the front part of said saddle body and a rear end respectively fastened to the left and right ends of said bottom saddle frame.

2. The shock-absorbing bicycle saddle as claimed in claim 1, wherein said bottom saddle frame comprises two vertical locating holes respectively disposed in the left and right ends thereof; said top saddle frame comprises two vertical bottom stems respectively downwardly extended from the left and right ends thereof and respectively inserted into the locating holes of said bottom saddle frame through said elastic members.

3. The shock-absorbing bicycle saddle as claimed in claim 2, wherein said bottom saddle frame comprises a connecting member having two bearing rings respectively disposed in left and right ends thereof, and two positioning members coupled between said top saddle frame and said bracket, said positioning members each having a top engagement block respectively upwardly inserted into the bearing rings of said connecting member and respectively connected to said elastic members, a bottom block located on a bottom side of said top engagement block and respectively stopped below the bearing rings of said connecting member, and an endless locating groove extended around a periphery of said bottom block; and wherein the vertical locating holes of said bottom saddle frame are respectively formed in said positioning members and vertically extended through the top engagement blocks of said positioning members; and rear ends of said shank portions of said bracket are respectively hooked on the endless locating grooves of the bottom blocks of said positioning members.

4. The shock-absorbing bicycle saddle as claimed in claim 3, wherein said elastic members are flat spherical elastomers respectively molded from rubber, each having a vertical through hole and a bottom coupling portion formed in a bottom end of the vertical through hole; the vertical bottom stems of said top saddle frame are respectively inserted through the vertical through holes of said elastic members and inserted into the vertical locating holes of said bottom saddle frame; and the top engagement blocks of said positioning members of said bottom saddle frame are respectively engaged into the bottom coupling portions of said elastic members.

* * * * *